June 24, 1947. R. W. SLOANE 2,423,052
SEAL
Filed Nov. 12, 1943
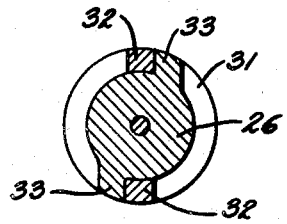
Fig.6
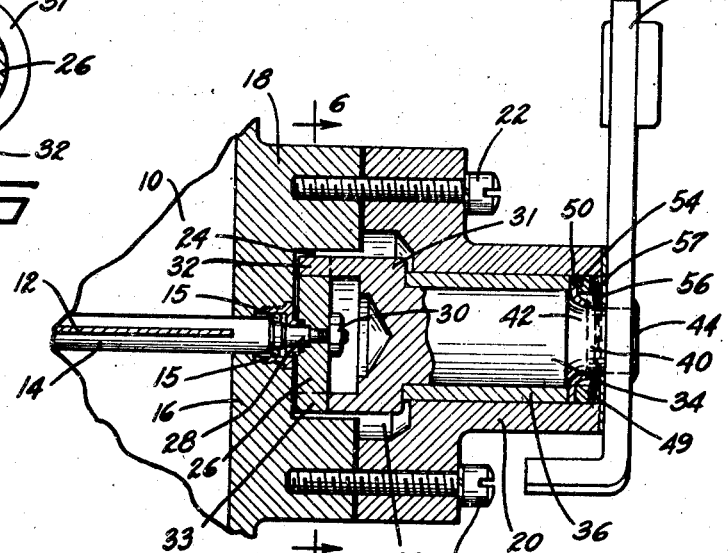
Fig.1
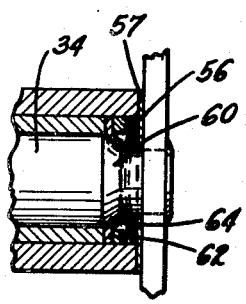
Fig.7
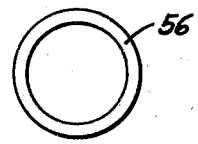
Fig.2
Fig.3
Fig.4
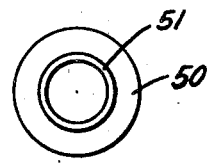
Fig.5
INVENTOR
ROBERT W. SLOANE
BY Patented June 24, 1947

2,423,052

UNITED STATES PATENT OFFICE 2,423,052

SEAL

Robert W. Sloane, Detroit, Mich., assignor to Bendix Aviation Corporation, South Bend, Ind., a corporation of Delaware Application November 12, 1943, Serial No. 510,006

11 Claims. (Cl. 286—7)

This invention relates to seals and particularly to packing seals for the shafts of carburetors, governors, and the like.

Considerable difficulty is encountered in preventing dust, water and other foreign matter from entering the shaft bearings of carburetors and governors and thereby causing undue wear as well as sticking of said shafts and bearings. In extreme cases such dust, et cetera, may even be drawn into the carburetor induction passage and from there carried into the engine cylinders where the abrasive effects on the piston and cylinder walls will cause undue wear of these parts. Such wearing of the shafts and bearings may also result in the leakage of sufficient quantities of air into the carburetor induction passage so as to adversely effect the proportions of fuel and air of the fuel mixture, that is, such leakage of air tends to lean the mixture, a condition which may cause considerable difficulty particularly when the engine is operating within the idling range.

It is therefore an important object of the invention to provide an inexpensive seal for carburetor and/or governor shafts which will overcome the above difficulties in a simple and effective manner.

It is another object of the invention to provide a relatively thin, pliable and resilient seal, engageable with the bearing within which the shaft is adapted to rotate and with a tapered shoulder portion of the shaft.

Still another object of the invention is to provide a device of this character wherein suction on the carburetor side of the seal will cause said seal to act like a feather valve to thereby add to the effectiveness of the seal.

A further object of the invention is to provide a device of this character wherein the seal is maintained in position by a somewhat U-shaped spring washer, that is, the washer is curved in one plane only and provides a uniform pressure on the seal about its peripheral edge, for retaining said seal in position.

A still further object is to provide, in a device of this character, a retaining ring between the seal and spring washer.

Another object of the invention is to provide a device of this character that is reliable and that may be easily assembled.

Still another object of the invention is to provide a device of this character wherein improvements reside in certain novel details of construction and arrangement of parts.

The characteristics and advantages of the invention are further sufficiently referred to in connection with the following detailed description of the accompanying drawings, which represent a preferred embodiment of said invention and a modification thereof. After considering these examples, skilled persons will understand that many variations may be made without departing from the principles disclosed; and I contemplate the employment of any structures, arrangements, or modes of operation that are properly within the scope of the appended claims.

Referring to the drawings:

Figure 1 shows a partial section of a carburetor throttle body and throttle valve operating mechanism embodying the present invention;

Figure 2 is a side view of the spring washer per se adapted to maintain the seal in position;

Figure 3 is a plan view of the same;

Figure 4 is a sectional view through the seal per se as shown in Figure 1;

Figure 5 is a plan view of the same;

Figure 6 is a section taken on line 6—6 of Figure 1; and

Figure 7 is a partial section of the throttle valve driving mechanism embodying a modification of the present invention.

Throughout the drawings similar reference characters refer to similar parts except where said parts are modified in structure and function, in which case they are given further different reference characters.

Referring more particularly to Figure 1, there is shown a carburetor induction passage, indicated generally at 10, controlled by a throttle valve 12 attached to a throttle shaft 14 which is rotatable in ball bearings 15 in the wall 16 of the induction passage. The carburetor is provided with a lateral extension 18 having a flattened surface to which a driver shaft housing 20 is secured by screws 22.

The extension 18 is provided with a recess 24 in which is freely received a collar 26 secured on a reduced portion 28 of the throttle shaft 14 and held thereon by a nut 30, it being noted that the shaft 14 is provided with a shoulder against which the collar 26 abuts and which holds said collar in spaced relation to the bottom of said recess. A driver shaft, having an intermediate portion 34 rotatably mounted in a bushing or bearing 36 fixed in the housing 20, is provided with an enlarged end portion 31, which may be considered the inner end of the driver shaft, and integral with said portion 31 are a plurality of lugs 32 engageable with ears 33 of the collar 26 to thereby form a one-way connection between the driver shaft and the throttle shaft, as best shown in Figure 6. While the foregoing connection between the driver shaft and the throttle shaft may be used it is to be understood that any other suitable connecting means may be substituted therefor. The driver shaft also is provided with an outer end portion 40 of reduced diameter having a concavely rounded shoulder 42 at its junction with the intermediate portion 34 of the driver shaft and the outer end of the reduced portion 40 is shown as flattened or riveted at 44 to retain a throttle lever 46 on the shaft, although the lever 46 may be attached to the driver shaft by any other suitable known means. A washer 57 may, if desired, be interposed between the lever 46 and the adjacent end of the housing 20. It is to be noted that the bushing 36 extends a slight distance into a recess 48 in the housing in which the enlarged portion of shaft 44 is received, and said enlarged portion has a shoulder which abuts against the adjacent end of the bushing 36, an arrangement which prevents frictional engagement of the enlarged portion 31 with the bottom of the recess 48. The opposite end of the bushing is spaced inwardly of the outer end of the casing against which lever 46 abuts thus providing a chamber 49 for the sealing means which comprises a relatively thin perforated seal or gasket 50 received on the reduced portion 40 of the driver shaft, said seal or gasket being of pliable, resilient material of any well known character, such as J. M. Gasket Stock, for example, it being understood however that any other suitable material having similar characteristics may be used. The seal or gasket is punched from flat stock and when the device is assembled assumes the shape shown in Figures 1, 4 and 5, a peripheral edge portion sealingly abutting against the adjacent end of the bushing 36 which preferably extends outwardly slightly beyond the plane of the base of the concavely rounded shoulder 42 of the shaft 34, for a purpose to be hereinafter explained, and the central portion 51 of the gasket 50 becomes concave convex in shape, curving to conform with the curvature of the shoulder 42 against which it sealingly fits. In order to retain the gasket 50 securely in the sealing position a relatively stiff retaining ring 54 is used, said ring bearing on a peripheral portion of the gasket on the side opposite that engaging the bushing 36 and said retaining ring 54 is urged against the gasket by a U-shaped spring washer 56 which is curved in one plane only, as best shown in Figure 2. The retaining ring 54 is preferably thick enough so that the plane of its outer side is spaced outwardly of the outer end of the seal 50 so that the latter will not come into direct contact with the spring washer 56 which reacts between said retaining ring and the washer 57 thereby providing the tension necessary to hold the retainer and the seal in operative position. While it is preferred that the retaining ring 54 and spring washer 56 be of metal such as steel, they may be of any other suitable material having the characteristics required for the respective parts.

Inasmuch as the seal or gasket 50 is of relatively thin and pliable or resilient material and is placed under tension by the spring washer 56 it is believed to be obvious from the foregoing that the gasket will effectively seal the driver shaft and bushing or bearing 36 against the entrance of dust and other foreign matter and will effectively prevent the leakage of air between said bushing and shaft. Further, because the gasket or seal 50 is extremely light in weight and is flexible, suction from the carburetor induction passage, which may be transmitted between the driver shaft and bushing 36, will tend to cause the gasket to act like a feather valve and be drawn tightly against the shoulder 42 of the shaft and the adjacent end of said bushing 36.

It should be noted that because the seal 50 assumes a concavo-convex shape only when it engages the shoulder 42 the fact that the base of the shoulder 42 does not extend beyond the end of the bushing 36 does not impair the effectiveness of said seal, it being understood that it is desirable that said shoulder base be spaced slidably inwardly of the adjacent end of the bushing 36 to provide against slight variations in the relative positions of the parts, which will arise from manufacturing tolerances. That is, the dimensions are so chosen that the outer edge or base of the shoulder 42 on the driver shaft cannot come within a predetermined distance, such as for example .010 of an inch or other suitable distance, of the adjacent end of the bushing, all limits being applied so as to cause the outer edge of the shoulder to be slightly farther away from said end of the bushing and inside the bushing rather than projecting beyond it. If the base or outer edge of the shoulder were to project beyond the bushing, it would tend to have a cutting action on the seal 50 or lift it from its seat on the end of the bushing, thereby destroying its sealing properties.

Referring to Figure 7 it will be noted that the driver shaft is provided with a frusto-conical shoulder 60 instead of the concavely rounded shoulder 42 shown in Figure 1. The sealing gasket 62, which, as in the embodiment shown in Figures 1, 4 and 5, is also flat until installed, becomes centrally modified in shape when thus installed so that the central flange 64 is of frusto-conical shape, conforming to the shape of the shoulder 60 and snugly fitting against said shoulder. The functioning of the arrangement shown in Figure 6 is substantially the same as the functioning of that shown in Figure 1. It will be noted that in Figure 7 the spring washer 56 is assembled with the edges curving away from the retainer ring as distinguished from the arrangement shown in Figure 1, wherein the central portion curves away from the retainer ring and adjacent end of the seal 50, it being understood that either arrangement may be used.

While the present invention has been disclosed in connection with a removable throttle driver assembly, it is believed to be obvious that it may be used directly on a suitably shouldered throttle shaft, governor shaft or the like, and it is thought that though the invention has been illustrated and described in connection with but two modifications thereof many of its advantages will be understood from the foregoing description and that it will be apparent that various changes may be made in the form, construction, and arrangement of the parts without departing from the spirit and scope of the invention or sacrificing all of its material advantages, the forms hereinbefore described being merely preferred embodiments.

I claim:

1. In a carburetor having a throttle controlled induction passage: a throttle shaft extending through the wall of the induction passage; a fixed shoulder extending about said shaft; an inclined shoulder on the shaft extending outwardly of the fixed shoulder and being of smaller size at its outer end than at the end adjacent said fixed shoulder, the base of the shoulder on the shaft being spaced inwardly somewhat of the outer end of the fixed shoulder; a sealing gasket engageable with said shoulders; a throttle lever fixed to the shaft in outwardly spaced relation to the shoulder of said shaft; and spring means reacting between the lever and gasket for urging the latter into sealing relationship with both said shoulders.

2. In a carburetor having a throttle valve shaft extending through the wall of the induction passage: a fixed shoulder about the shaft adjacent the end thereof; a shoulder on the shaft, having a base positioned inwardly of the plane of the fixed shoulder, said shoulder on the shaft curving inwardly to a reduced portion of said shaft, outwardly of the plane of said fixed shoulder; a throttle lever fixed to the reduced portion of the shaft in outwardly spaced relation to the shoulder thereof; a normally flat gasket received on the reduced portion of the shaft and having a central portion sealingly engageable with the shoulder of the shaft and a peripheral portion sealingly engageable with the fixed shoulder, said central portion being adapted to conform to the shape of the shoulder on the shaft when the device is assembled; a retaining ring adapted to engage the side of the gasket opposite the fixed shoulder; and a resilient U-shaped washer adapted to react between the throttle lever and the retaining ring to provide tension for holding the retainer and the gasket in position.

3. In a carburetor including a throttle shaft: a lateral extension integral with the wall of the carburetor and having a flat surface; a recess in said extension into which one end of the throttle shaft extends; a collar secured to the shaft and disposed within said recess; a housing attached to the flat surface of the extension and having a bore axially aligned with the throttle shaft and a recess opening into the recess of the extension; a bushing in said bore, said bushing having one end extending a slight distance into the recess of the housing and having its other end spaced inwardly of the outer end of the housing; a driver shaft rotatably mounted in the bushing and having a shoulder on its inner end adapted to engage the adjacent end of the bushing, said driver shaft being operably connected with the collar; a concave shoulder for said driver shaft adjacent the outer end thereof and inclined to a reduced portion of said shaft which extends outwardly of the outer end of the housing; a relatively light thin flexible sealing gasket engaging the shoulder of the outer end of the shaft and the adjacent end of the bushing; a retainer ring engaging the seal; a lever secured to the outer end of the driver shaft; and a spring washer curved in one plane only and reacting between the lever and retainer ring.

4. In a driver assembly for carburetor shafts: a housing having a longitudinal bore therethrough; a flange on one end of said housing adapted to be attached to a carburetor body; a recess in the flanged portion of the housing; a bushing fixed in the bore of the housing; a driver shaft rotatably mounted in the bushing and having an enlarged end including a shoulder adapted to engage the adjacent end of the bushing which extends into said recess; means adapted to operably connect the large end of the shaft with the carburetor shaft; a shoulder on the other end of the driver shaft, said shoulder tapering inwardly to a reduced portion of the driver shaft which extends beyond the adjacent end of the housing; a normally flat flexible seal adapted to engage the last mentioned shoulder of the shaft and the adjacent end of the bushing; and resilient means adapted to urge the seal into sealing engagement with the said shoulders and cause a portion of the seal to conform to the shape of shoulder on the driver shaft.

5. In sealing means for a shaft rotatably mounted in a housing: a tapered shoulder on the shaft; a fixed shoulder in the housing adjacent the shoulder of the shaft, the fixed shoulder being positioned intermediately of the planes of the ends of the tapered shoulder; a resilient seal adapted to engage said shoulders, said seal being relatively thin and flexible and when installed is adapted to conform to the shape of the sealing surfaces of said shoulders; and a resilient washer curved in one plane only and adapted to urge the seal into engagement with the shoulders.

6. In a carburetor having an induction passage: a throttle shaft extending through the wall of said induction passage; a shoulder on said shaft; a fixed shoulder about said shaft; a thin, light, resilient gasket having portions engageable with the respective shoulders; and means normally holding the gasket in position, said gasket being adapted to act as a feather valve which tends to be drawn into sealing engagement with the shoulders by suction thereon from the induction passage transmitted about the throttle shaft.

7. In a driver assembly: a housing having a bore therein; a shaft rotatably mounted in the bore; said shaft including a reduced portion; a shoulder tapering inwardly from the large portion of the shaft to the reduced portion; a fixed shoulder in the housing about the shaft, said fixed shoulder being located between the planes of the respective ends of the tapered shoulder; a thin, resilient seal engaging the shoulders and, when installed, conforming to the shape thereof; means for retaining the seal in position; and a washer between the seal and said means of sufficient thickness to space the seal and retaining means apart at all times.

8. In sealing means for a shaft rotatably mounted in a housing: a tapered shoulder on the shaft; a fixed shoulder in the housing adjacent the shoulder of the shaft, the base of the tapered shoulder being spaced somewhat inwardly of the plane of the fixed shoulder; a resilient seal engaging said shoulders; a resilient washer urging the seal into engagement with the shoulders; and a spacing washer between the seal and the resilient washer, said spacing washer being of sufficient thickness to prevent the resilient washer from directly contacting the seal, and said seal being thin and flexible and adapted to conform to the shape of the sealing surfaces of the shoulders under the pressure of the resilient washer.

9. In a carburetor having a throttle controlled induction passage: a throttle shaft extending through the wall of the induction passage; a fixed shoulder extending about the shaft; an inclined shoulder on the shaft extending outwardly of the fixed shoulder and being of smaller size at its outer end than at the inner end, the base of the shoulder on the shaft being spaced inwardly somewhat of the outer end of the fixed shoulder; a sealing gasket engageable with said shoulders; a spacing washer engaging the seal on the side thereof opposite the shoulders; and yielding means adapted to exert pressure on the spacing washer for urging same against the seal.

10. In a driver assembly: a housing having a bore therein, an enlargement in said bore forming a fixed shoulder in said housing, a shaft rotatably mounted in the bore and having a shoulder spaced longitudinally relative to the fixed shoulder and within the smaller portion of said bore, a thin resilient seal engaging the shoulders, and resilient means to press said seal into sealing engagement with said shoulders.

11. In a driver assembly: a housing having a bore therein, an enlargement in said bore forming a fixed shoulder in said housing, a shaft rotatably mounted in the bore and having a shoulder spaced longitudinally relative to the fixed shoulder and within the smaller portion of said bore, a thin resilient seal engaging the shoulders, means for retaining the seal in position, and a spacer element between the seal and said means of sufficient thickness to space the seal and retaining means apart at all times.

ROBERT W. SLOANE.

REFERENCES CITED

The following references are of record in the file of this patent:

UNITED STATES PATENTS

| Number | Name | Date |
|---|---|---|
| 1,956,844 | Wheeler | May 1, 1934 |
| 1,991,173 | Rautenstrauch | Feb. 12, 1935 |
| 2,018,768 | Swenson | Oct. 29, 1935 |
| 2,287,369 | Anderson | June 23, 1942 |
| 2,054,369 | Francis, Jr. | Sept. 15, 1936 |
| 1,954,192 | Biggs | Apr. 10, 1934 |
| 2,331,161 | Bauernschmid | Oct. 5, 1943 |
| 2,361,993 | Chandler | Nov. 7, 1944 |

Certificate of Correction

Patent No. 2,423,052.                                                                                   June 24, 1947.

ROBERT W. SLOANE

It is hereby certified that error appears in the printed specification of the above numbered patent requiring correction as follows:

Column 4, lines 16 and 17, for the word "slidably" read *slightly*;

and that the said Letters Patent should be read with this correction therein that the same may conform to the record of the case in the Patent Office.

Signed and sealed this 7th day of December, A. D. 1948.

[SEAL]

THOMAS F. MURPHY,
*Assistant Commissioner of Patents.*